Sept. 20, 1966   R. L. RIPERT   3,273,852
BALL VALVE CONSTRUCTION
Filed May 14, 1964   2 Sheets-Sheet 1

INVENTOR
Roger Louis RIPERT

ATTORNEY

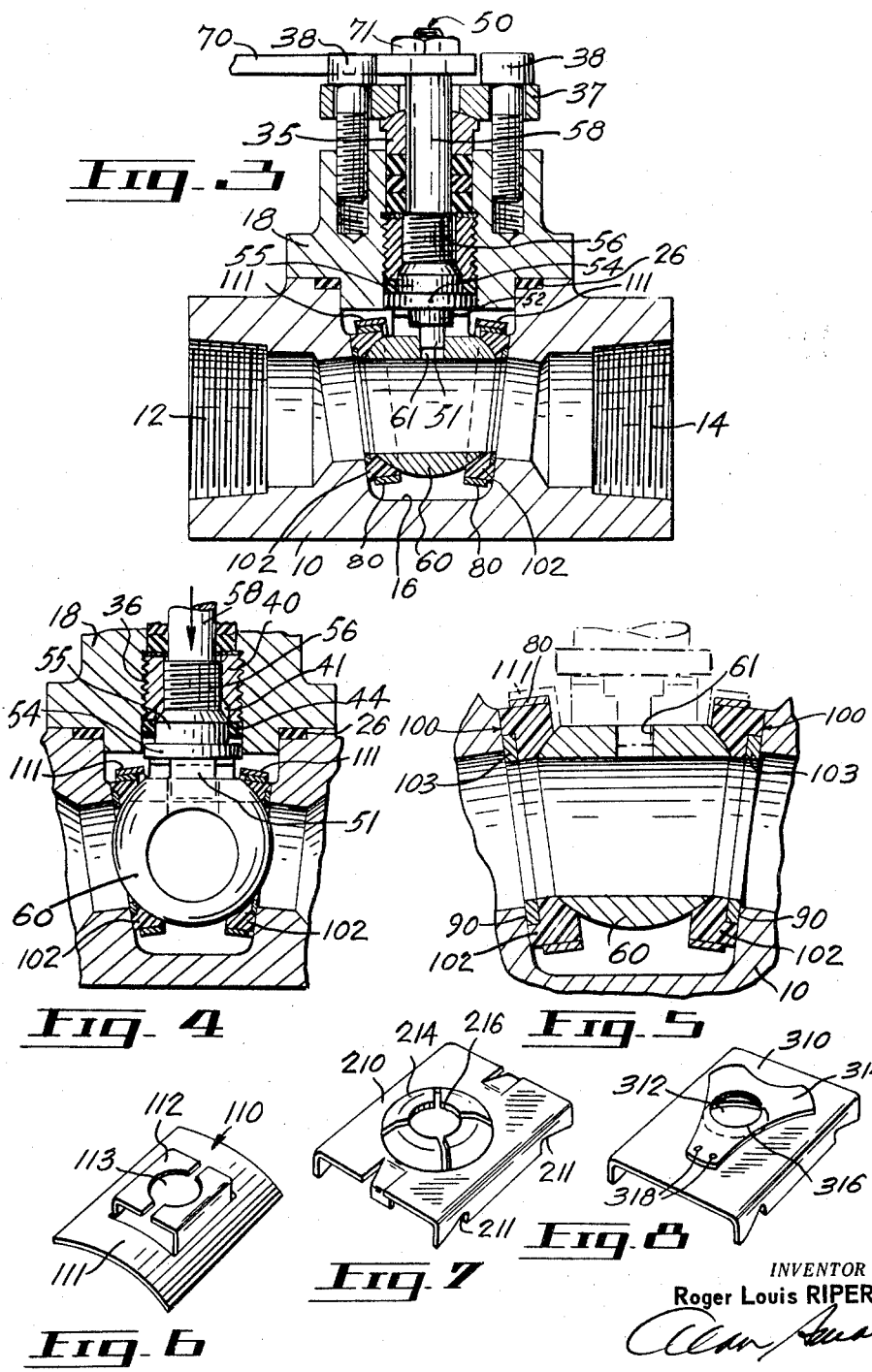

United States Patent Office 3,273,852
Patented Sept. 20, 1966

3,273,852
BALL VALVE CONSTRUCTION
Roger Louis Ripert, Roxboro, Quebec, Canada, assignor to Velan Engineering Companies, Quebec, Quebec, Canada
Filed May 14, 1964, Ser. No. 367,427
5 Claims. (Cl. 251—171)

The present invention relates to improvements in the construction of ball valves and more particularly to a ball valve construction embodying means for adjusting the seating pressure applied to the usual annular seat seals and maintaining a resilient pressure on these seals during normal operation.

Many attempts have been made in prior art ball valve designs to overcome the known problems inherent in ball valve constructions of the "wedge seat" type with which the invention is concerned, namely the seat seals should be readily available for service and maintenance without the necessity of completely disassembling the valve; means should be provided to compensate for wear of the seats sealing surface during operation in order to maintain the required sealing contact; and means should also be provided whereby the degree of pressure can be adjusted as applied to the seals in order to maintain the sealing contact and compensate for wear.

As noted above, many prior art attempts have been made to overcome these problems, for example, United States Patent 3,058,484 issued October 16, 1962 shows a ball valve construction wherein the pressure maintained on a pair of opposed annular valve seat seals by the direct contact of a cylindrical member which is threadably inserted in the upper portion of the valve body so that it can be moved up or down against the upper edges of the seat seals by selective engagement of the spindle of the valve. This is accomplished by having a splined bore in the center of the cylindrical member with a correpsonding spline on the lower end of the spindle so that by raising the spindle from its normal ball engaging position it can be engaged with the cylindrical pressure member and the necessary adjustment made. While this overcomes certain of the adjustment problems mentioned above, the pressure applied is a direct positive pressure and accordingly care must be taken to avoid excess pressure which could force the seat seals into greater than necessary sealing contact and which may well result in making it extremely difficult to remove the seal seats.

To avoid the positive application of pressure on the valve seats as shown in U.S. Patent 3,058,484, for example, there are other known ball valve constructions which embody a resilient pressure applied directly to the ball itself so that as it is engaged with the seat seals these are maintained in sealing contact with the body. These of course depend on the selected spring strength for adjustment.

Knowing the problems involved, the present invention aims to provide an improved ball valve construction of the wedge seat type which embodies means whereby resilient seating pressure is maintained on the seats during operation which is varied between the open and closed positions of the valve and also embodies means whereby a positive adjustment can be made of this resilient pressure when necessary to compensate for excessive wear. The construction of the valve itself and the arrangement of the pressure seating means is such that adjustments can be readily made without the necessity of disassembling the valve.

More specifically, the present valve construction embodies a valve spindle having a threaded lower portion so that rotation of the spindle for opening and closing of the valve also imparts a reciprocal movement to the spindle. A bridge member having at least a resilient portion is mounted concentrically of but free of connection with the inner end of the valve spindle in such a manner that end portions bear on the upper surfaces of the opposed seat seals. The valve spindle is provided adjacent the lower end with an enlargement which bears on the bridge member so that as the spindle reciprocates the positive pressure applied to the bridge and consequently the resiliently biased pressure applied to the seals is varied between the open and closed positions of the valve. In the preferred construction the threaded end of the spindle is engaged in a correspondingly tapped exteriorly threaded bushing mounted in the valve bonnet so that a positive adjustment of the spindle movement can be made to compensate for wear on the seat seals.

Having thus described the nature of the invention, particular reference will be made to the accompanying drawings showing a preferred embodiment thereof, and in which;

FIGURE 3 is a vertical cross-section of the construction shown in FIGURE 1 with the valve shown in open position.

FIGURE 4 is a fragmentary view of a portion of the valve construction in cross section showing the lower end of the valve spindle, seat bridge and seal seats with the valve moving to closed position the direction of spindle movement being indicated by arrow on spindle.

FIGURE 5 is an enlarged fragmentary view in section of the ball valve, and seat seals with the lower end of the valve spindle and the seat bridge shown in broken lines, the valve stem moving up as indicated releasing the pressure as valve is moved to open position.

FIGURE 6 is a view in perspective elevation of one preferred form of seat bridge shown as being embodied in the valve construction of FIGURES 1 through 5.

FIGURE 7 is a view in perspective elevation of an alternative form of seat bridge.

FIGURE 8 is a view in perspective elevation of a further alternative form of seat bridge.

Figure 1:
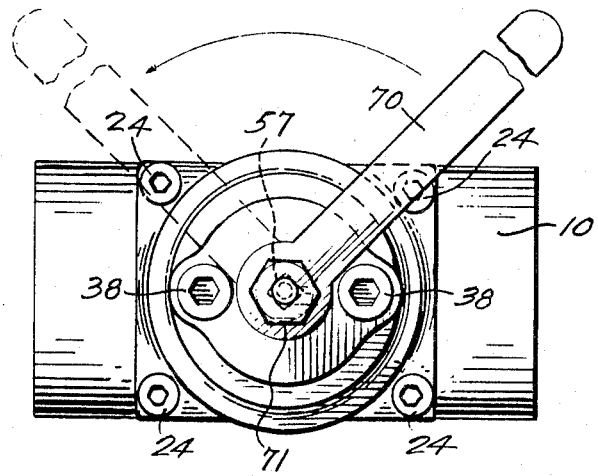
FIGURE 1 is a plan view of a ball valve construction of the wedge seat type embodying the seat retaining arrangement of the invention with the alternate or "open" position of the valve handle shown in broken lines.
Figure 2:
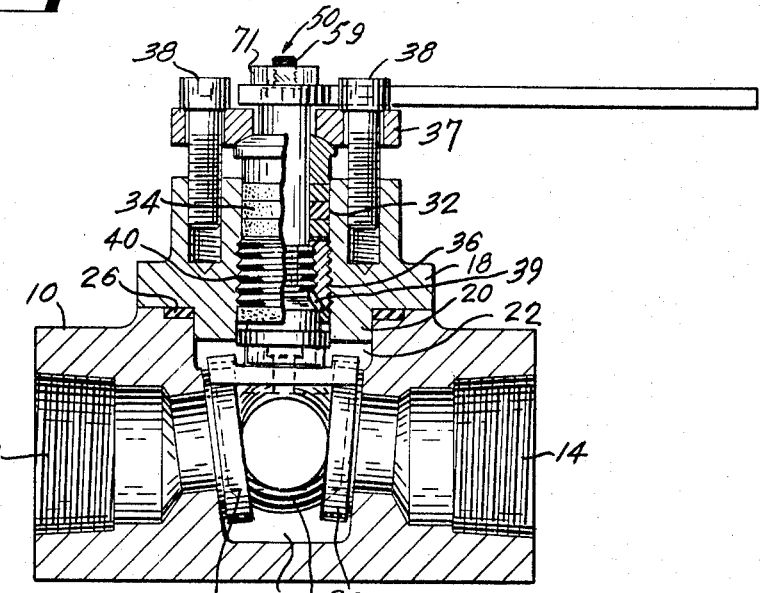
FIGURE 2 is a vertical cross-section of the valve construction shown in FIGURE 1 with the packing and seal seats shown in full lines to more clearly illustrate their construction, the valve being in closed condition.

With particular reference to FIGURE 1 and 2 of the drawings, the valve construction shown consists of a main valve housing 10 of generally cylindrical outline having opposed fluid openings 12 and 14 extending axially therethrough to meet with a central space forming the valve chamber 16. The valve chamber 16 is open at the top and the valve body is completed by a bonnet 18 having a projecting lower portion 20 fitting snugly within an upper enlarged portion 22 of the chamber 16 surrounding the open top. The bonnet 18 is secured to the housing 10 by means of cap screws 24 as shown in FIGURE 1, with an annular sealing ring 26 therebetween as shown in FIGURE 3.

The bonnet 18 has an axial boring 30 having a first unthreaded upper portion 32 adapted to receive the usual spindle packing rings 34 and a lower portion which is threaded as indicated at 36 to receive a tapped bushing 40. The lower portion of the bushing 40 is provided with a tapered enlargement 41 to accommodate the valve spindle as will be described and the portion of the boring 30 beneath the threaded section 36 is enlarged to accommodate a spindle sealing ring 44.

The valve spindle 50 has a terminal end 51 of reduced dimensions and shaped in rectangular form to fit loosely within a corresponding slot 61 in a ball valve 60, a somewhat larger portion of circular cross section 52, an outstanding annular portion 54, a further portion of lesser diameter 55 tapering upwards to meet a threaded section 56 adapted for engagement with the threaded section 36 of the bushing 40, a main spindle portion 58 having an upper end 57 of reduced squared section terminating in a threaded terminal portion 59.

The spindle 50 is mounted for rotary and reciprocal movement in the bonnet 18 by the insertion of the tapped bushing 40, which in the preferred form has a slotted end 39 to permit adjustment from the exterior of the bonnet. The spindle 50 is passed up through the bushing 40 from the lower face of the bonnet so that the threaded portion 56 is engaged with the threaded section 36 of the bushing, the sealing ring 44 being previously placed in position. The packing rings 34 are placed in position and held in place by a packing collar 35 over which is placed a packing flange plate 37 adjustably retained by cap screws 38. The heads of the cap screws 38 also act as the terminal stops for the movement of a valve lever handle 70 which is mounted on the squared end 57 and held in place by a locking nut 71 engaged with the spindle end portion 59.

The ball valve 60 is of the usual spherical form having the axial slot or recess 61 engageable by the valve stem end 51 and is previously inserted in the housing chamber 16 together with a pair of annular sealing seats 100 as is shown most clearly in FIGURE 5. As previously mentioned, the present valve construction is of the wedge seat type with opposed sloping seating surfaces 90 within the chamber 16 at the inner ends of the fluid passages or openings 12 and 14. The annular sealing seats 100 are preferably made as comprising of the self-sealing type having an outer flanged ring of metal 80, a main annular portion of resilient wear-resisting plastic material 102, and an annular deformation resisting insert 103 of metal.

In accordance with the present invention these opposed seal seats 100 are maintained in pressure sealed contact with the seating surfaces 90 by the action of a seat bridge member 110 which, as shown shown in detail in FIGURE 6, is shaped from suitable resilient metal so as to have a main body portion 111 of slightly arcuate cross-section and a centrally located punched-out portion 112 having a central opening 113 accommodating the reduced end portions 51 and 52 of the valve spindle 50.

The alternative seat bridge constructions shown in FIGURES 7 and 8 are similar to that shown in FIGURE 6. In the construction shown in FIGURE 7, the member 210 is made as a channel section with inwardly sloping notches 211 shaped to fit the opposed upper surfaces of the seats 100. The central portion 212 is shaped to have a raised annular portion 214 having a central opening 216 so as to act as a spring washer for the desired resilient bias.

The construction of FIGURE 8 is also similar to that shown in FIGURE 7 in that the bridge member 310 is again a channel section, notched as before, with a central opening 312. In this construction the resilient bias is provided by a spring type washer 314 having a central opening 316 which is spot welded as indicated at 318 at one leg to the upper surface of the member 310. It is to be noted that the raised portion 112 and raised resilient portions 214, 314 each provide in effect a "thrust limiter" which prevents excessive direct pressure being applied to the seal seats 100. As all of the bridge members function in the same manner reference will be made only to the action of the preferred form 110 as shown in FIGURES 2 through 5.

In use, as shown most clearly in FIGURES 4 and 5 for example, the seat bridge member 110 is placed over the end of the valve spindle 50 with the marginal side portions bearing on the upper surfaces of the seal seats 100.

The valve spindle 50 is initially adjusted so that at the "full open position" the spindle portion 54 bears sufficiently on the bridge portion 120 to maintain a light resilient pressure. When the spindle 50 is rotated between the full open to fully closed position the downward movement of the spindle acts on the bridge so as to resiliently press the seats into positive sealing relationship against the seating surfaces 90. With this arrangement it will be obvious that when the pressure on the bridge member 110 is released, the seats, through the resilient nature of the main seat portions 102 will rise slightly as shown in FIGURE 5 reducing the possibilities of deformation by continued compression to a minimum and therefore maintaining the self sealing qualities of the seat.

In addition, this "release" of the seats reduces the friction between the ball valve 60 and the cooperating seating surfaces of the seats making the opening of the valve easier and eliminating the possibility of a "frozen valve" as is possible with the positive pressure type of seat retaining constructions.

To obtain access to the seal seats it is a simple matter to remove the four (4) cap screws 24 and remove the bonnet without the necessity of disassembling the packing and mounting assembly for the valve spindle. If an adjustment is necessary to the extent of the reciprocal movement of the valve spindle 50 this is also readily accomplished without removal of the valve bonnet by removing the cap screws 38 releasing the packing flange plate 37 so that the packing collar 35 and rings 34 can be removed to permit entry of a tool fitting the slotted end of the bushing 40.

I claim:

1. A ball valve construction comprising a main valve housing having an open-topped inner valve chamber with opposed converging sealing seat surfaces and aligned fluid passages extending from the exterior of said housing to said valve seat surfaces, a ball valve having an opening therethrough mounted within said valve chamber for rotary movement between an open and closed position between a pair of opposed annular seal seats slidably fitting against said chamber sealing surfaces and adapted to cooperate with said valve and surfaces to form a pressure seal, a seal seat pressure member having at least a resilient portion and being mounted within said chamber to span the upper surface of said ball valve and having end portions engaging the upper side surfaces of said opposed seal seats, a valve bonnet mounted on said housing sealing off said valve chamber open top and a valve spindle mounted for restricted rotational and reciprocal movement within said bonnet, said valve spindle having an end portion extending within said valve chamber and operatively engaging said ball valve for rotational movement relative to said annular seal seats and also to engage said seal seat pressure member for restricted reciprocal movement simultaneously with said ball rotational movement to urge said seal seats along said chamber sealing seat surfaces in the direction of convergence when said ball valve is rotated to closed position and to release said seal seat pressure means when said ball valve is rotated to the opposite open position.

2. A ball valve construction as claimed in claim 1, wherein said seal seat pressure member comprises a bridge plate of substantially channel-shaped cross-section having a centrally located opening of sufficient diameter to accommodate a lower end portion of said spindle, said bridge plate having at least a resilient portion adapted for engagement by a portion of said spindle above said lower end and downwardly extending side surfaces adapted to contact said seal seats.

3. A ball valve construction as claimed in claim 2, wherein said resilient portion extends above the upper surface of said bridge plate and includes a spindle contacting portion spaced from said plate upper surface, said central opening being located concentrically of said spindle contacting portion.

4. A ball valve construction as claimed in claim 1, wherein each of said annular seal seats comprise a main annular body of resilient plastic material having a front seating surface surrounding the central opening shaped to conform with the contours of said ball valve and a flat rear seating surface provided with an inwardly extending annular recess surrounding the central opening, an annular metal rim mounted about the periphery of said main plastic body and a flat annular metal plate mounted in said rear surface recess, whereby said main plastic body is restrained from excessive trans-axial and axial deformation when said seal seat is in operative sealing position.

5. A ball valve construction as claimed in claim 1, wherein said valve bonnet has a central bore to accommodate said valve spindle and said bore has a threaded portion, an internally tapped and externally threaded cylindrical bushing mounted in said bore threaded portion, said valve spindle having at least a threaded portion engaged with said tapped interior of said threaded bushing, whereby rotation of said spindle within said bonnet bore also imparts an axial reciprocal movement to said spindle, the location of said spindle lower end portion relative to the lower surface of said valve bonnet being adjustable by rotation of said cylindrical bushing within said bonnet bore internally tapped portion.

No references cited.

WILLIAM F. O'DEA, *Primary Examiner.*

H. WEAKLEY, *Examiner.*